US012051436B2

(12) United States Patent
Takahashi et al.

(10) Patent No.: US 12,051,436 B2
(45) Date of Patent: Jul. 30, 2024

(54) SIGNAL PROCESSING APPARATUS, SIGNAL PROCESSING METHOD, AND PROGRAM

(71) Applicant: Sony Group Corporation, Tokyo (JP)

(72) Inventors: Naoya Takahashi, Tokyo (JP); Takao Fukui, Tokyo (JP)

(73) Assignee: Sony Group Corporation, Tokyo (JP)

( * ) Notice: Subject to any disclaimer, the term of this patent is extended or adjusted under 35 U.S.C. 154(b) by 187 days.

(21) Appl. No.: 17/761,572

(22) PCT Filed: Jul. 22, 2020

(86) PCT No.: PCT/JP2020/028423

§ 371 (c)(1),
(2) Date: Mar. 17, 2022

(87) PCT Pub. No.: WO2021/059718

PCT Pub. Date: Apr. 1, 2021

(65) Prior Publication Data

US 2022/0375485 A1 Nov. 24, 2022

(30) Foreign Application Priority Data

Sep. 24, 2019 (JP) ................................. 2019-172688

(51) Int. Cl.
*G10L 21/028* (2013.01)
*G10L 21/0388* (2013.01)
*G10L 25/21* (2013.01)

(52) U.S. Cl.
CPC ........ *G10L 21/028* (2013.01); *G10L 21/0388* (2013.01); *G10L 25/21* (2013.01)

(58) Field of Classification Search
CPC ...... G06F 21/6245; G10H 1/125; G10H 1/46; G10H 2210/056; G10H 2250/311;
(Continued)

(56) References Cited

U.S. PATENT DOCUMENTS 10,347,258 B2 * 7/2019 Sasaki .................. G10L 19/005
2011/0075832 A1 3/2011 Tashiro
(Continued)

FOREIGN PATENT DOCUMENTS

JP 2011-075728 A 4/2011
WO WO 2015/079946 A1 6/2015
(Continued)

OTHER PUBLICATIONS

International Search Report and English translation thereof mailed Sep. 1, 2020 in connection with International Application No. PCT/JP2020/028423.

*Primary Examiner* — Lun-See Lao
(74) *Attorney, Agent, or Firm* — Wolf, Greenfield & Sacks, P.C.

(57) ABSTRACT

A signal processing apparatus is provided that includes a sound source separation section configured to apply sound source separation processing to a mixed sound signal including a mixture of signals of a plurality of sound sources, and band extension sections configured to apply frequency band extension processing to respective sound source separation signals obtained by separation by the sound source separation section.

14 Claims, 8 Drawing Sheets

(58) Field of Classification Search
CPC . G10L 19/005; G10L 19/0204; G10L 19/032; G10L 19/07; G10L 19/08; G10L 19/16; G10L 19/22; G10L 19/24; G10L 21/0272; G10L 21/028; G10L 21/0388; G10L 25/21; G10L 25/93
USPC .......................................... 381/74, 119, 71.14
See application file for complete search history.

(56) References Cited

U.S. PATENT DOCUMENTS

| | | | | |
|---|---|---|---|---|
| 2012/0099741 | A1* | 4/2012 | Gotoh | H03G 9/18 381/119 |
| 2016/0249138 | A1* | 8/2016 | Van der Werf | H04R 25/356 |
| 2017/0374478 | A1* | 12/2017 | Jones | G10L 21/0364 |
| 2019/0110135 | A1* | 4/2019 | Jensen | H04R 25/505 |

FOREIGN PATENT DOCUMENTS

| | | | |
|---|---|---|---|
| WO | WO 2018/047643 | A1 | 3/2018 |
| WO | WO 2018/177611 | A1 | 10/2018 |

* cited by examiner

SIGNAL PROCESSING APPARATUS, SIGNAL PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/028423, filed in the Japanese Patent Office as a Receiving Office on Jul. 22, 2020, which claims priority to Japanese Patent Application Number JP2019-172688, filed in the Japanese Patent Office on Sep. 24, 2019, each of which is hereby incorporated by reference in its entirety.

TECHNICAL FIELD

The present disclosure relates to a signal processing apparatus, a signal processing method, and a program.

BACKGROUND ART

A sound source separation technology is known in which a signal for a sound of a target sound source is extracted from a mixed sound signal including sounds from a plurality of sound sources (see, for example, PTL 1). Additionally, a frequency band extension (expansion) technology has been proposed in which high frequency components are generated from a signal with low frequency components and in which the resultant high frequency components are added to the signal with the low frequency components to generate a signal with a wider frequency band (see, for example, PTL 2).

CITATION LIST

Patent Literature

[PTL 1]
PCT Patent Publication No. WO2018/047643
[PTL 2]
PCT Patent Publication No. WO 2015/079946

SUMMARY

Technical Problem

In this field, appropriate frequency band extension processing or the like is desired to be executed.

An object of the present disclosure is to provide a signal processing apparatus, a signal processing method, and a program that execute appropriate frequency band extension processing or the like.

Solution to Problem

The present disclosure provides, for example, a signal processing apparatus including a sound source separation section configured to apply sound source separation processing to a mixed sound signal including a mixture of signals of a plurality of sound sources, and band extension sections configured to apply frequency band extension processing to respective sound source separation signals obtained by separation by the sound source separation section.

The present disclosure provides, for example, a signal processing method including, by a sound source separation section, applying sound source separation processing to a mixed sound signal including a mixture of signals of a plurality of sound sources and, by band extension sections, applying frequency band extension processing to respective sound source separation signals obtained by separation by the sound source separation section.

The present disclosure provides, for example, a program causing a computer to execute a signal processing method including, by a sound source separation section, applying sound source separation processing to a mixed sound signal including a mixture of signals of a plurality of sound sources and, by band extension sections, applying frequency band extension processing to respective sound source separation signals obtained by separation by the sound source separation section.

DESCRIPTION OF EMBODIMENTS

Figure 1:
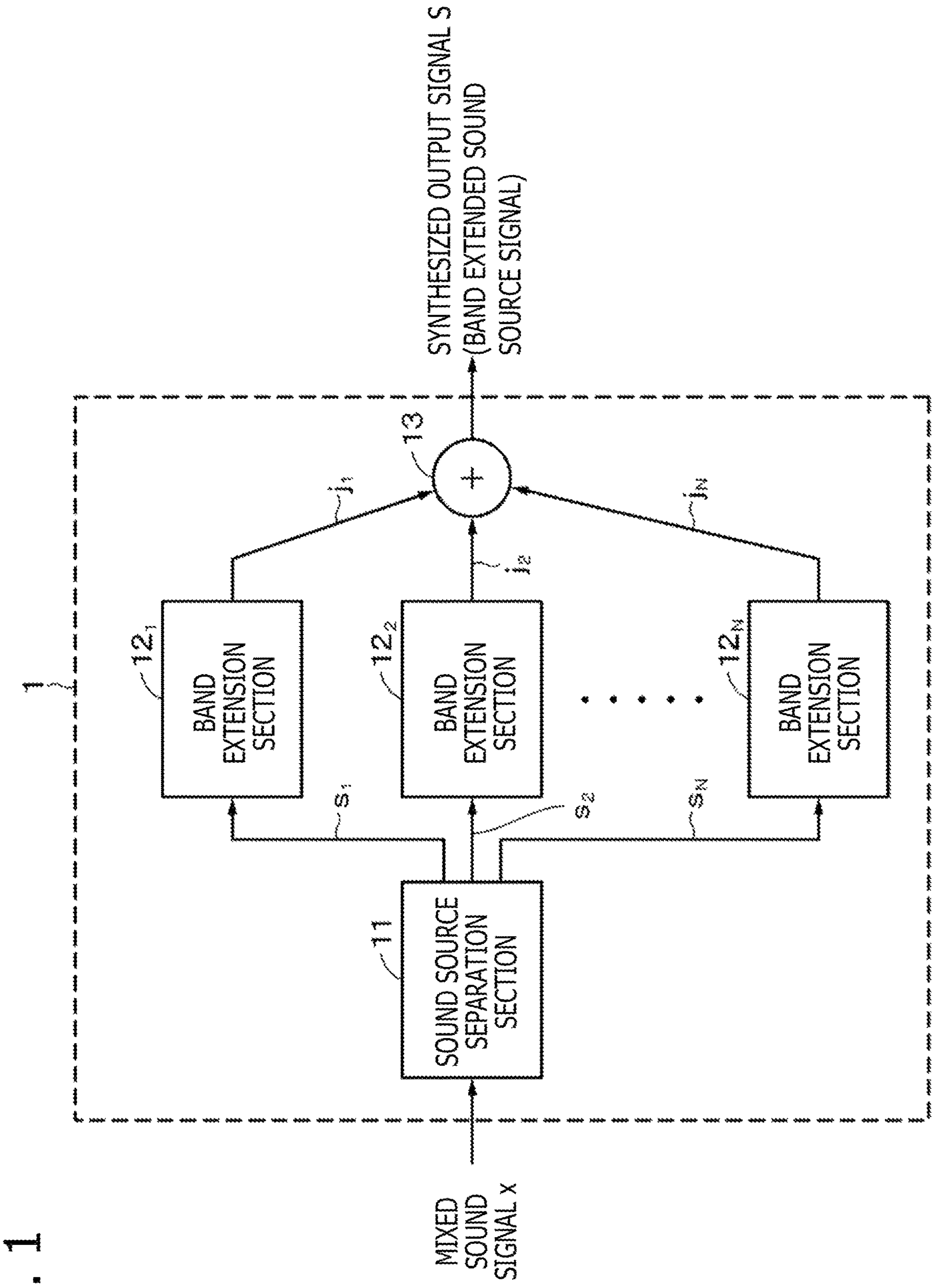
FIG. 1 is a block diagram depicting a configuration example of a signal processing apparatus according to a first embodiment.

Embodiments and the like of the present disclosure will be described below with reference to the drawings. Note that the description is made in the following order.

<Problems to Be Considered in Embodiments>
<First Embodiment>
<Second Embodiment>
<Third Embodiment>
<Modified Examples>

The embodiments and the like described below are suitable specific examples of the present disclosure, and the contents of the present disclosure are not limited to the embodiments and the like.

Problems to be Considered in Embodiments

First, to facilitate understanding of the present disclosure, problems to be considered in the embodiments will be described. As described above, an apparatus is known in which frequency band extension processing (hereinafter simply referred to as band extension processing) is executed. When a limited band of a sound source is to be extended, correctly executing band extension processing is difficult because a frequency envelope (spectrum envelope) varies depending on the type of a sound source such as a musical instrument. For example, cymbals and other percussion instruments, and traditional Japanese musical instruments such as a shakuhachi, a shamisen, and a koto make sounds containing up to extremely high frequency components, whereas musical instruments such as a piano and a violin have a property that attenuation increases consistently with frequency. In a case where sound sources do not temporally overlap one another, the types of the sound sources can be estimated at each point of time and behavior of the band extension processing (contents of the processing) can be varied depending on the type. However, for music or the like, typically, a plurality of types of sound sources simultaneously makes sounds, and thus it is difficult to execute appropriate band extension processing depending on the type of the sound source.

Additionally, in recent years, high-resolution audio having a sampling rate of more than 48 kHz (hereinafter referred to as a high-resolution sound source as appropriate) has spread. When high-resolution sound sources are to be produced, some sounds such as vocals are recorded as high-resolution sound sources, but sounds of many musical instruments may be recorded as standard-resolution audio having a sampling rate of 48 kHz or less (hereinafter referred to as standard-resolution sound sources as appropriate). Thus, in such a case, there is a demand to make the sounds of all the musical instruments have a high-resolution during a repeated mastering step (remastering). At this time, band extension processing is preferably applied only to sound sources not recorded at a high resolution, without editing sound sources recorded at a high resolution. However, the sounds of all the sound sources are mixed during a mixing step, posing a problem in that whether or not to execute the band extension processing fails to be selected for each sound source during a repeated mastering step. The present disclosure has been developed in view of these circumstances. The present disclosure will be described below in detail.

First Embodiment

Signal Processing Apparatus According to First Embodiment

Configuration Example

FIG. 1 is a block diagram illustrating a configuration example of a signal processing apparatus according to a first embodiment (signal processing apparatus 1). The signal processing apparatus 1 includes, for example, a sound source separation section 11, a band extension section 12, and an addition section 13. In the present embodiment, a mixed sound signal x is input to the sound source separation section 11, the mixed sound signal x including a mixture of sounds (signals) of a plurality of (for example, N (N is a natural number)) sound sources. The signal processing apparatus 1 includes N band extension sections (band extension section $12_1$, band extension section $12_2$, . . . , and band extension section $12_N$) corresponding to the number of sound sources. Note that, in a case where the individual band extension sections need not be distinguished from one another, the band extension sections are collectively referred to as the band extension section 12 as appropriate.

The sound source separation section 11 applies sound source separation processing to the mixed sound signal x to generate sound source separation signals $s_1$, $s_2$, . . . , and $s_N$ corresponding to the types of the respective sound sources. The sound source separation signal $s_1$ is supplied to the band extension section $12_1$. The sound source separation signal $s_2$ is supplied to the band extension section $12_2$. The sound source separation signal $s_N$ is supplied to the band extension section $12_N$.

The sound source separation processing executed by the sound source separation section 11 is not limited to particular processing. For example, in addition to MWF (Multi Channel Wiener Filter) based sound source separation processing using DNN (Deep Nature Networks), sound source separation processing described in PTL 1 listed above can be applied. The sound source separation processing described in PTL 1 is, roughly speaking, processing in which amplitude spectra are estimated using different sound source separation schemes having outputs with temporally different properties (specifically, DNN and LSTM (Long Short Term Memory)) and in which estimation results are concatenated using a predetermined concatenation parameter to generate sound source separation signals. Needless to say, the sound source separation section 11 may execute sound source separation processing different from the sound source separation processing described above.

The band extension section 12 applies band extension processing to each of the sound source separation signals s obtained by separation by the sound source separation section 11. The band extension section 12 uses, as input signals, for example, sound source separation signals s corresponding to low frequency signal components, applies the band extension processing to the sound source separation signals s, and outputs resultant output signals as output signals j containing low frequency components and also containing high frequency components with extended bands (output signal $j_1$, output signal $j_2$, . . . , and output signal $j_N$). The band extension section 12 applies, to the sound source separation signals s, well-known band extension processing, for example, band extension processing described in PTL 2 listed above. Note that the individual band extension sections 12 are associated with the respective types of the sound source separation signals s to be input to the corresponding band extension sections 12.

Note that an extension start band hereinafter refers to a lowest-frequency-side end of frequency components to be extended by the band extension processing and that high frequency components refer to signals with frequency bands higher than the extension start band, whereas low frequency components refer to signals with frequency bands lower than the extension start band.

The addition section 13 adds together the output signals j output from the band extension sections 12 (specifically, the output signal $j_1$, the output signal $j_2$, . . . , and the output signal $j_N$) to generate a synthesized output signal S, and outputs the synthesized output signal S. In the present embodiment, a band extended sound source signal corresponding to an output of the signal processing apparatus 1 is assumed to be the synthesized output signal S.

General Operation Example

Now, an example of operations performed by the signal processing apparatus 1 will be described. The mixed sound signal x is input to the sound source separation section 11. The sound source separation section 11 applies the sound source separation processing to the mixed sound signal x to generate sound source separation signals s, and outputs the sound source separation signals s. The band extension sections 12 apply the band extension processing to the sound source separation signals s to generate output signals j, and output the output signals j. The addition section 13 adds the output signals j together to generate a synthesized output signal S, and outputs the synthesized output signal S.

Operation Example of Band Extension Section

Incidentally, the band extension processing described in PTL 2 listed above is based on a mixed sound, and does not take into account execution of the optimum band extension processing depending on attributes of a sound source, specifically, the type of the sound source. For example, cymbals as percussion instruments and the like involve an envelope extending up to high frequencies without attenuation. Thus, in the present embodiment, for execution of the optimum band extension processing for each type of sound source, a frequency envelope of high frequency components (high frequency band) to be estimated is set for each type of sound source. Specifically, a parameter for the band extension processing corresponding to the type of the sound source is set, and the band extension processing is executed using the parameter. Equipment that estimates a high frequency band may be applied as the band extension section, the equipment having been caused to learn only the type of the sound source (for example, a cymbal sound) as training data.

Figure 2:
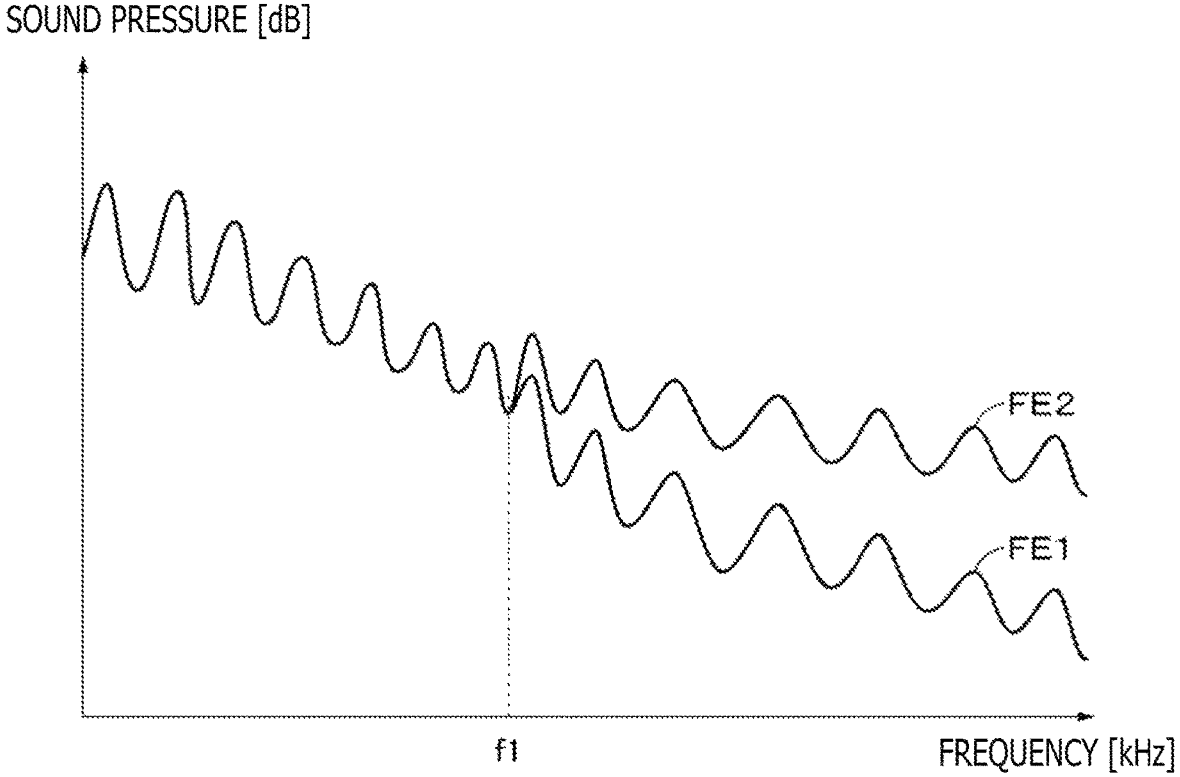
FIG. 2 is a diagram referenced when an operation of a band extension section according to the first embodiment is described.

FIG. 2 depicts examples of a frequency envelope corresponding to the type of the sound source. In FIG. 2, a horizontal axis indicates frequency (Hz), and a vertical axis indicates sound pressure (dB). Additionally, in FIG. 2, f1 denotes the extension start band. Further, in FIG. 2, a frequency envelope FE1 following the extension start band f1 schematically indicates a frequency envelope of, for example, a sound source of vocals, and a frequency envelope FE2 following the extension start band f1 schematically indicates a frequency envelope of, for example, a sound source of cymbals. For the band extension section 12 corresponding to the vocals, a parameter for generating the frequency envelope FE1 is set. Further, for the band extension section 12 corresponding to the cymbals, a parameter for generating the frequency envelope FE2 is set. This allows each band extension section 12 to execute the appropriate band extension processing corresponding to the attributes of the sound source input to the band extension section 12. Note that the parameter is appropriately set according to the contents of the band extension processing.

Second Embodiment

Now, a second embodiment of the present disclosure will be described. Note that the matters described in the first embodiment can also be applied to the second embodiment unless otherwise noted. Additionally, components identical or equivalent to the corresponding components in the first embodiment are denoted by identical reference symbols, and duplicate descriptions are omitted as appropriate.

Overview of Second Embodiment

In a case where the band extension processing is executed independently for each sound source separation signal, the high frequency components of the synthesized output signal S may be unnaturally emphasized depending on an algorithm for the band extension processing. For example, in a case where the algorithm for the band extension processing estimates only amplitude spectra or envelopes of the amplitude spectra and duplicates a phase in a certain manner (for example, uses a phase same as that of low frequency components (low frequency band)), and where a sound source separation algorithm also involves a phase not varying significantly for each separation sound source, the high frequency signals of sound source separation signals with extended bands all have similar phases. Thus, even with the amplitude spectrum of each sound source separation signal or the envelope of the amplitude spectrum correctly estimated, the high frequency components of the synthesized output signal S may be unnaturally emphasized because all the high frequency signals have similar phases. The present embodiment is a signal processing apparatus having a configuration addressing the matters described above.

Signal Processing Apparatus According to Second Embodiment

Configuration Example

Figure 3:
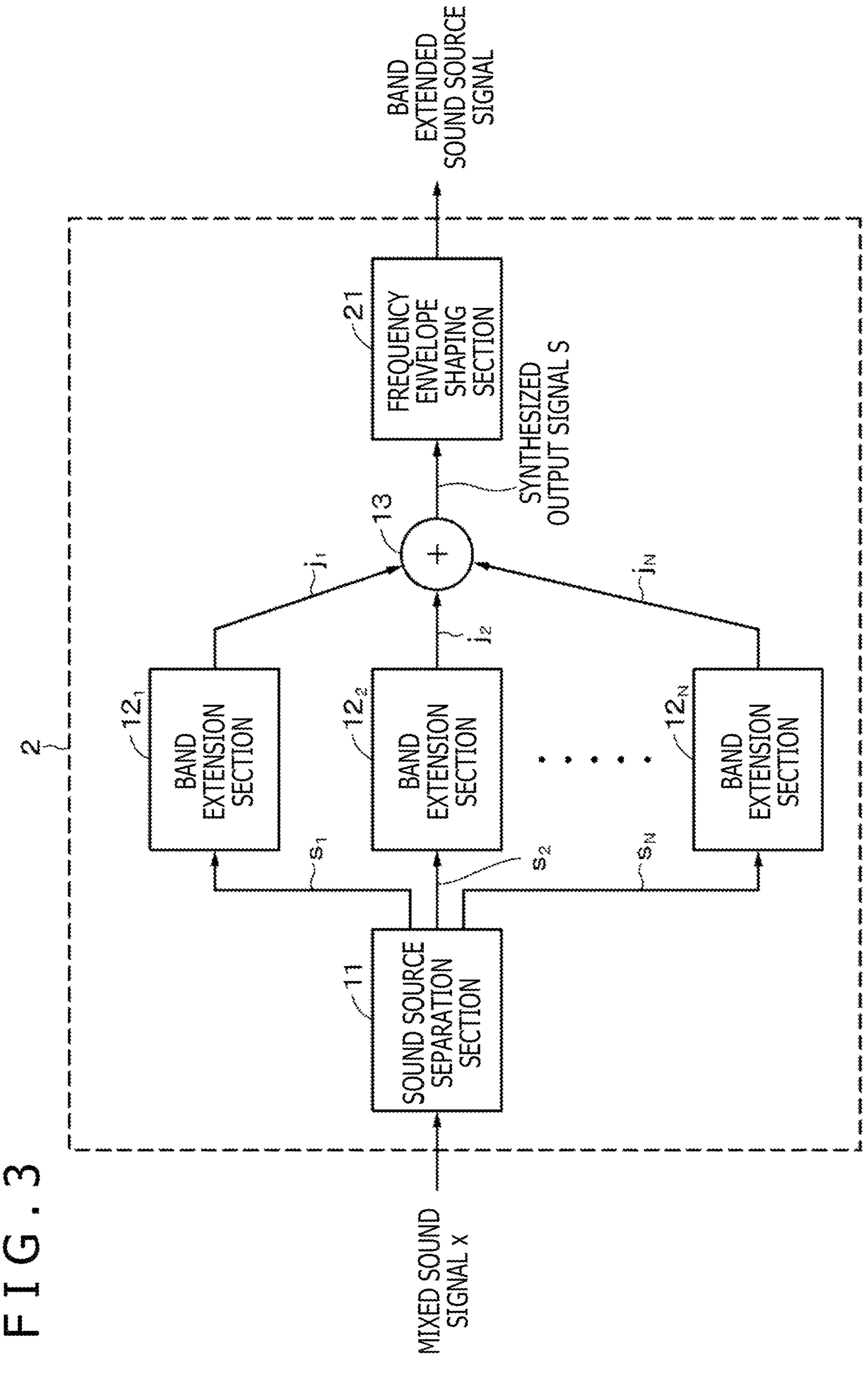
FIG. 3 is a diagram referenced when a configuration example of a signal processing apparatus according to a second embodiment is described.

FIG. 3 is a block diagram depicting a configuration example of a signal processing apparatus according to the second embodiment (signal processing apparatus 2). The signal processing apparatus 2 differs from the signal processing apparatus 1 in that the signal processing apparatus 2 includes a frequency envelope shaping section 21 succeeding the addition section 13. In the present embodiment, an output of the frequency envelope shaping section 21 is assumed to be the band extended sound source signal.

The frequency envelope shaping section 21 shapes the frequency envelope of the synthesized output signal S output from the addition section 13. For example, in a case where predetermined discontinuity is detected between a portion of the frequency envelope preceding the extension start band (lower limit of the frequencies extended by the band extension processing) f1 and a portion of the frequency envelope succeeding the extension start band f1, the frequency envelope of the synthesized output signal S is shaped. In the present embodiment, the predetermined discontinuity is detected by the frequency envelope shaping section 21. However, the detection may be performed by another functional block. When the frequency envelope shaping section 21 shapes the frequency envelope, the amplitudes of the extended high frequency components are suppressed, allowing the high frequency components to be prevented from being unnaturally emphasized.

Operation Example

In the present embodiment, the discontinuity is detected in a case where a difference between a signal energy preceding the extension start band f1 and a signal energy succeeding the extension start band f1 is equal to or greater than a predetermined value. A specific example will be described with reference to FIG. 4.

Figure 4:
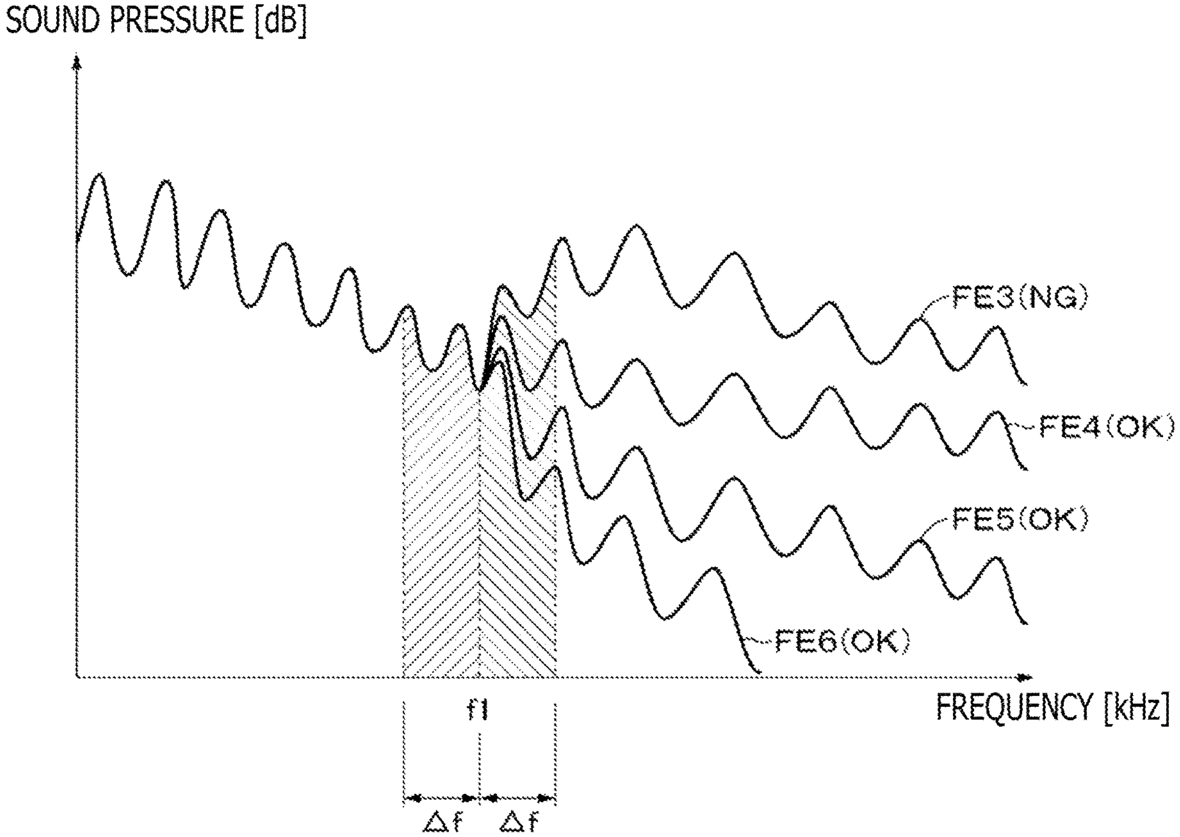
FIG. 4 is a diagram referenced when processing executed in the signal processing apparatus according to the second embodiment is described.

In FIG. 4, a horizontal axis indicates frequency (Hz), and a vertical axis indicates sound pressure (dB). Further, in FIG. 4, f1 denotes the extension start band. Additionally, in FIG. 4, frequency envelopes succeeding the extension start band f1 (frequency envelopes FE3 to FE6) illustrate examples of the frequency envelopes of high frequency components of the synthesized output signal S.

For example, as depicted in FIG. 4, predetermined frequency bands (f1−Δf) and (f1+Δf) are respectively set for the portions of the frequency envelope preceding and succeeding the extension start band f1, and the energy e (shaded portions in FIG. 4) of each of the frequency bands is determined for each frequency envelope. The discontinuity is determined to be present between the portions of the frequency envelope preceding and succeeding the extension start band f1 in a case where Formula 1 below is satisfied where $e_L$ denotes the energy in the low frequency band, $e_H$ denotes the energy in the high frequency band, and Th denotes a threshold for detecting the discontinuity.

$$(e_H/e_L)>Th \quad (1)$$

In the example illustrated in FIG. 4, in a case where the high frequency components of the synthesized output signal S form a frequency envelope FE3, Formula 1 is satisfied, leading to detection of presence of discontinuity. The frequency envelope FE3 makes the high frequency components unnaturally emphasized, and thus the frequency envelope shaping section 21 executes processing for shaping the frequency envelope, specifically, processing for suppressing the amplitudes of the high frequency components. In the processing for suppressing the amplitudes, the amplitudes of the high frequency components may be uniformly suppressed, or the amplitudes greater than a predetermined threshold may be exclusively suppressed.

On the other hand, in the example illustrated in FIG. 4, in a case where the high frequency components of the synthesized output signal S form one of the frequency envelopes FE4 to FE6, Formula 1 is not satisfied, leading to determination of absence of discontinuity. In this case, the high frequency components are unlikely to be unnaturally emphasized, and thus the frequency envelope shaping section 21 executes no processing, with the synthesized output signal S output from the frequency envelope shaping section 21.

According to the second embodiment described above, in a case where the band extension processing is executed, the high frequency components succeeding the extension start band can be prevented from being unnaturally emphasized.

Modified Example

Figure 5:
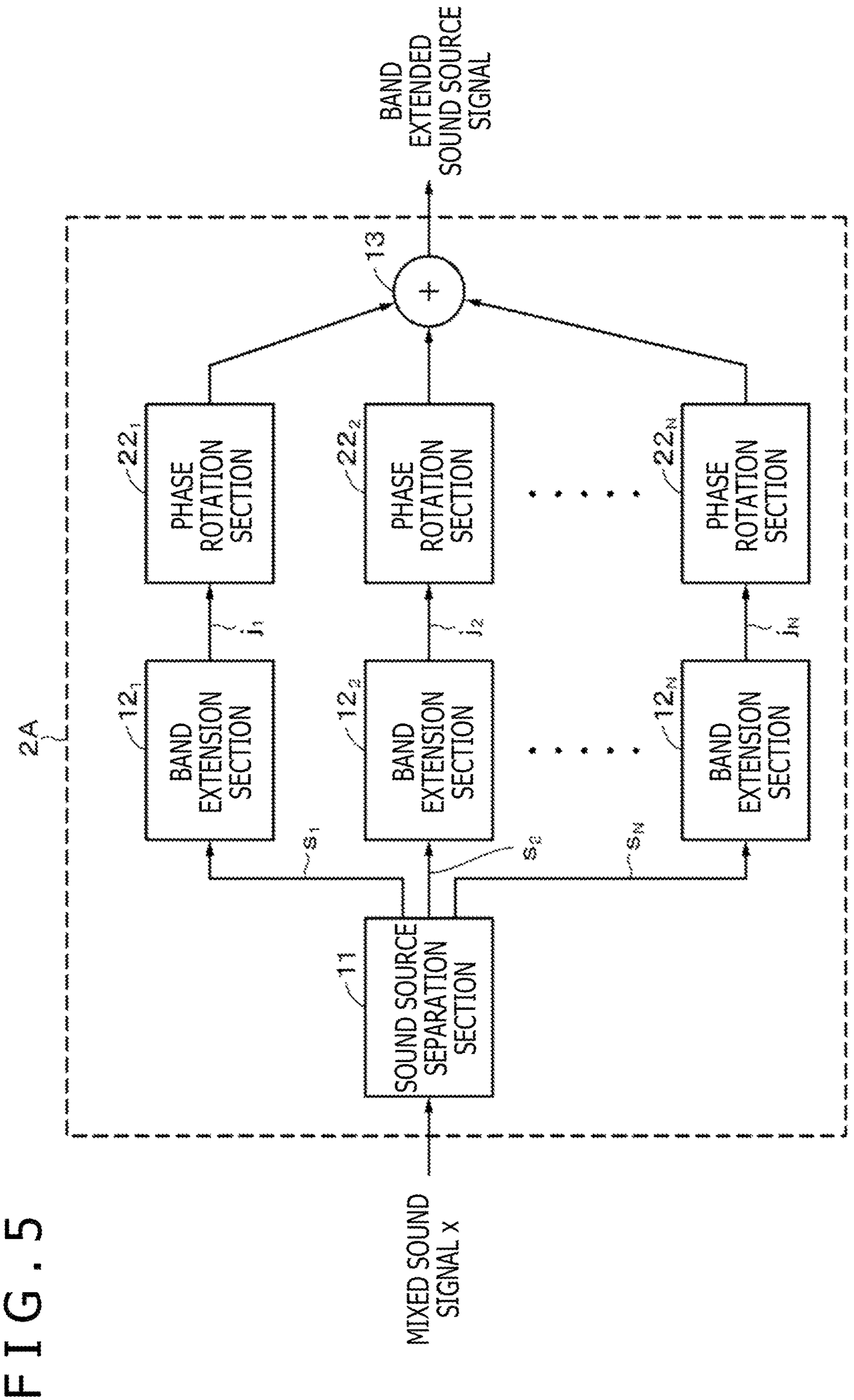
FIG. 5 is a diagram referenced when a modified example of the signal processing apparatus according to the second embodiment is described.

Now, a modified example of the signal processing apparatus according to the second embodiment will be described. FIG. 5 is a block diagram depicting a configuration example of a signal processing apparatus according to the modified example (signal processing apparatus 2A).

The signal processing apparatus 2A does not include the frequency envelope shaping section 21 but instead includes a phase rotation section 22. The phase rotation section 22 is provided between the band extension section 12 and the addition section 13. Specifically, the signal processing apparatus 2A includes phase rotation sections 22 (phase rotation section $\mathbf{22}_1$, $\mathbf{22}_2$, . . . , and $\mathbf{22}_N$) the number of which corresponds to the number of the band extension sections 12. Output signals from the phase rotation sections 22 are added together by the addition section 13.

The phase rotation sections 22 rotate (change) phases of the high frequency components of the output signals j with the bands extended by the band extension sections 12 such that the high frequency components of the output signals j have different phases depending on the sound sources. The phase rotation sections 22 each include, for example, a filter that can shift the phase without affecting the amplitude, specifically, an all-pass filter.

The phase rotation sections 22, for example, randomly rotate the phases, thus allowing the high frequency components of the band extended sound source signal to be prevented from being unnaturally emphasized. Additionally, human auditory characteristics are insensitive to a change in phase in high frequencies, and thus the high frequency components of the band extended sound source signal can be prevented from being unnaturally emphasized, without providing auditorially uncomfortable feeling to a user.

Third Embodiment

Now, a third embodiment of the present disclosure will be described. Note that the matters described in the first and second embodiments can also be applied to the third embodiment unless otherwise noted. Additionally, components identical or equivalent to the corresponding components in the first and second embodiments are denoted by identical reference symbols, and duplicate descriptions are omitted as appropriate.

Overview of Third Embodiment

As described above, among sound sources (hereinafter referred to as a mixed sound source as appropriate) including high-resolution sound sources (for example, sound sources containing high frequency components succeeding the extension start band f1) and standard-resolution sound sources (for example, sound sources containing no high frequency components succeeding the extension start band f1), there is a demand to apply the band extension processing only to the standard-resolution sound sources. The present embodiment addresses such a demand. Note that the band of the mixed sound source includes high frequencies succeeding the extension start band f1.

Signal Processing Apparatus According to Third Embodiment

Configuration Example

Figure 6:
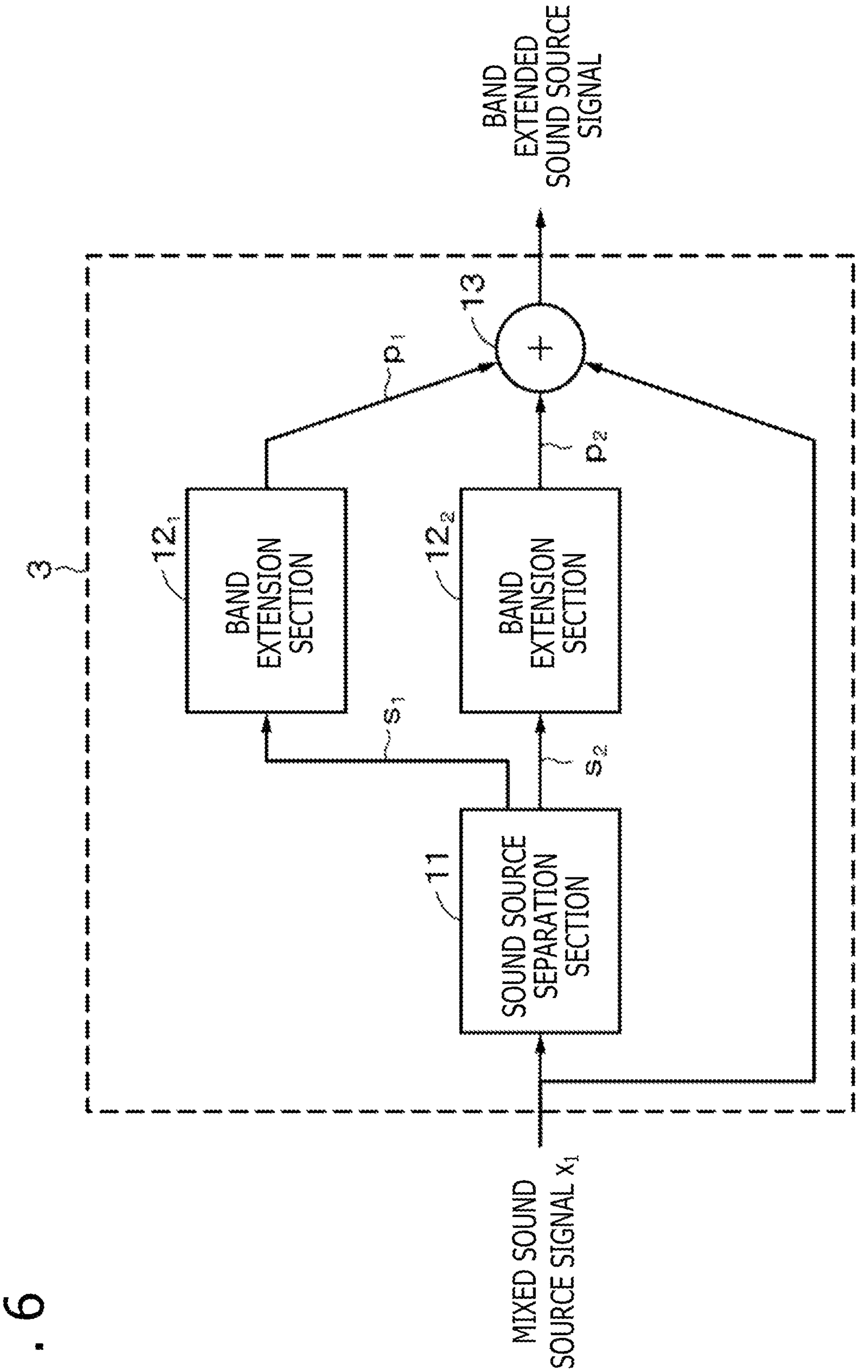
FIG. 6 is a diagram referenced when a configuration example of a signal processing apparatus according to a third embodiment is described.

FIG. 6 is a block diagram illustrating a configuration example of a signal processing apparatus according to the third embodiment (signal processing apparatus 3). Like the signal processing apparatus 1, the signal processing apparatus 3 includes the sound source separation section 11, the band extension section 12 (for example, the band extension sections $\mathbf{12}_1$ and $\mathbf{12}_2$), and the addition section 13. A signal of a mixed sound source (hereinafter referred to as a mixed sound source signal $x_1$ as appropriate) is input to the sound source separation section 11. The signal processing apparatus 3 differs from the signal processing apparatus 1 in that the signal processing apparatus 3 includes a system in which the mixed sound source signal $x_1$ is input to the addition section 13 as well as to the sound source separation section 11.

Operation Example

Now, an operation example of the signal processing apparatus 3 will be described. The mixed sound source signal $x_1$ is separated into signals for the respective sound source types by the sound source separation section 11, thus generating sound source separation signals s. Among the sound source separation signals s for the respective sound source types, only the sound source separation signals not recorded at a high resolution (sound source separation signals $s_1$ and $s_2$ in the present example) are respectively supplied to the corresponding band extension sections $\mathbf{12}_1$ and $\mathbf{12}_2$. The band extension section $\mathbf{12}_1$ executes the band extension processing to extend the band of the sound source separation signal Si. Further, the band extension section $\mathbf{12}_2$ executes the band extension processing to extend the band of the sound source separation signal $s_2$.

For the output signal obtained by applying the band extension processing, the band extension section $12_1$ outputs, to the addition section 13, an extended band signal $p_1$ included in the output signal and containing only the high frequency components succeeding the extension start band f1. Further, for the output signal obtained by applying the band extension processing, the band extension section $12_2$ outputs, to the addition section 13, an extended band signal $p_2$ included in the output signal and containing only the high frequency components succeeding the extension start band f1. In this regard, the band extension sections $12_1$ and $12_2$ output only the extended band signals to the addition section 13 because the low frequency components of the sound source separation signals $s_1$ and $s_2$ are included in the mixed sound source signal $x_1$ input to the addition section 13.

The addition section 13 adds the extended band signals $p_1$ and $p_2$ and the mixed sound source signal $x_1$ together to generate a band extended sound source signal, and outputs the band extended sound source signal.

According to the third embodiment described above, the sound source signals not recorded at a high resolution can exclusively be subjected to the band extension with no change in the high frequency components of the sound source signals recorded at a high resolution. Note that, in the above description, the sound source separation signals $s_1$ and $s_2$ are illustrated as sound source separation signals not recorded at a high resolution, but that the mixed sound source signal $x_1$ may include more sound source separation signals not recorded at a high resolution.

Modified Example 1

Figure 7:
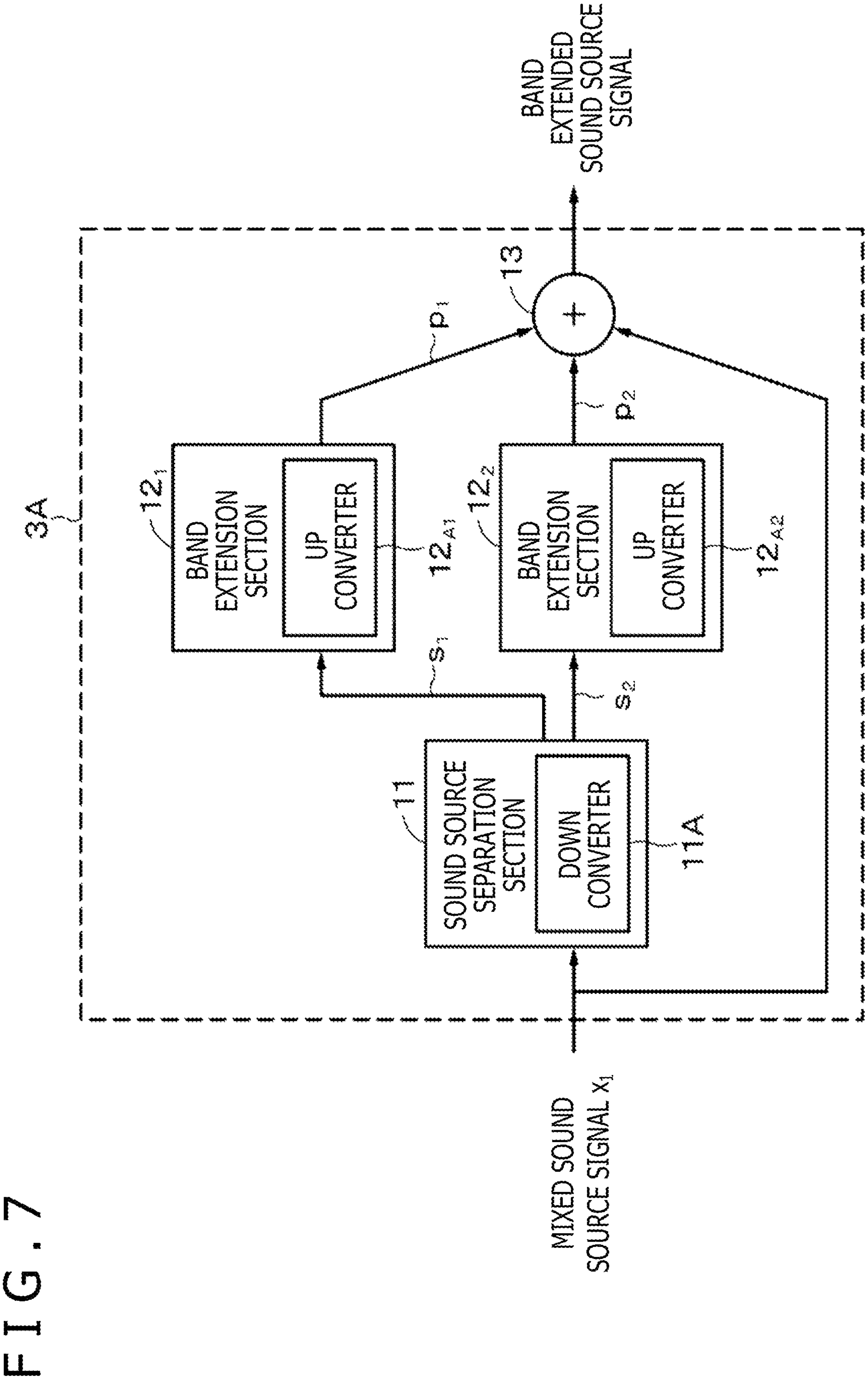
FIG. 7 is a diagram referenced when a modified example of the signal processing apparatus according to the third embodiment is described.

FIG. 7 is a block diagram illustrating a modified example of the signal processing apparatus according to the third embodiment. The example described above assumes that the sound source separation section 11 of the signal processing apparatus 3 has the capability of separating the sound sources including high-resolution sound sources. However, it is also assumed that the sound source separation section 11 lacks the capability of separating the sound sources including high-resolution sound sources.

In this case, as illustrated in FIG. 7, the sound source separation section 11 of the signal processing apparatus according to the present modified example (signal processing apparatus 3A) includes a down converter 11A that applies down sampling processing to the mixed sound source signal $x_1$. Performing down sampling on the down converter 11A enables the sound source separation section 11 to perform the sound source separation section 11 on the mixed sound source signal $x_1$. In such a configuration, for example, the band extension section $12_1$ includes an up converter $12_{A1}$ and executes the band extension processing after up sampling is performed. Similarly, the band extension section $12_2$ includes an up converter $12_{A2}$ and executes the band extension processing after up sampling is performed. The processing by the up converters $12_{A1}$ and $12_{A2}$ may be executed in respective preceding stages of the band extension sections $12_1$ and $12_2$.

Modified Example 2

Figure 8:
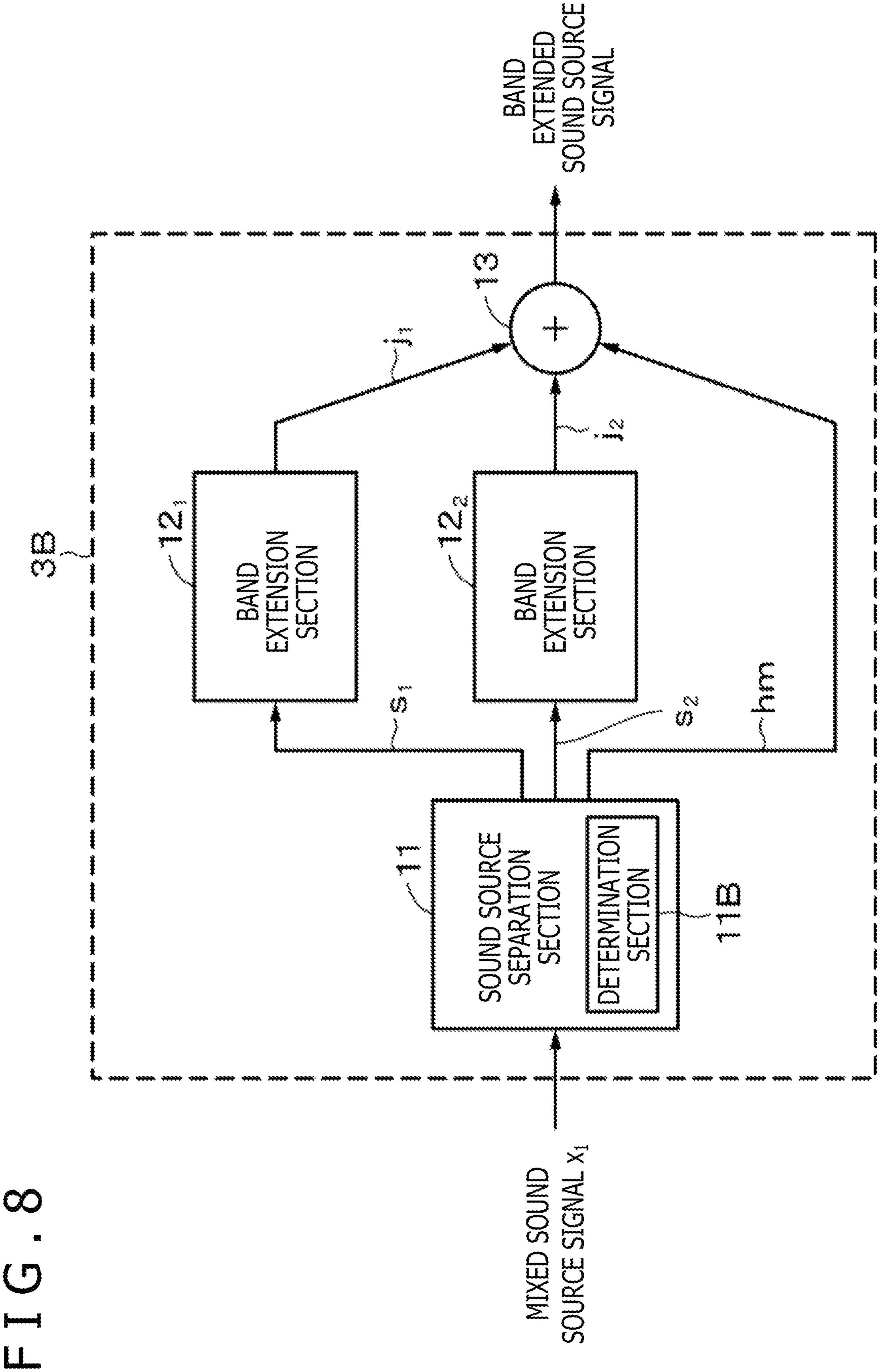
FIG. 8 is a diagram referenced when a modified example of the signal processing apparatus according to the third embodiment is described.

FIG. 8 is a block diagram illustrating another modified example of the signal processing apparatus according to the third embodiment. The sound source separation section 11 of the signal processing apparatus according to the present modified example (signal processing apparatus 3B) includes a determination section 11B. Note that the example assumes that the sound source separation section 11 of the signal processing apparatus 3B has the capability of separating the sound sources including the high-resolution sound sources.

In the signal processing apparatus 3B, the mixed sound source signal $x_1$ is supplied only to the sound source separation section 11 and not to the addition section 13. The sound source separation section 11 executes sound source separation processing on the mixed sound source signal $x_1$ to generate sound source separation signals $s_1$ and $s_2$ and a sound source separation signal hm corresponding to the sound source signals recorded at a high resolution. The determination section 11B determines whether or not to apply, in a succeeding stage, the band extension processing on each sound source separation signal. In a case where the sound source separation signal contains high frequency components, the determination section 11B determines that the band extension processing need not be applied to the sound source separation signal, and outputs the sound source separation signal to the addition section 13. In the present modified example, the determination section 11B determines that the band extension processing need not be applied to the sound source separation signal hm, and the sound source separation section 11 supplies the sound source separation signal hm to the addition section 13.

Further, in a case where the sound source separation signal contains no high frequency components, the determination section 11B determines that the band extension processing needs to be applied to the sound source separation signal, and outputs the sound source separation signal to the band extension section 12. In the present modified example, the determination section 11B determines that the band extension processing needs to be applied to the sound source separation signals $s_1$ and $s_2$, and the sound source separation signals $s_1$ and $s_2$ are respectively supplied to the band extension sections $12_1$ and $12_2$.

The band extension section $12_1$ applies the band extension processing to the sound source separation signal $s_1$ to generate an output signal $j_1$. In the configuration according to the signal processing apparatus 3B, the mixed sound source signal x1 is not supplied to the addition section 13, and thus the band extension section $12_1$ outputs, to the addition section 13, the output signal $j_1$ containing low frequency components, instead of an extended band signal. Further, the band extension section $12_2$ applies the band extension processing to the sound source separation signal $s_2$ to generate an output signal $j_2$. In the configuration according to the signal processing apparatus 3B, the mixed sound source signal $x_1$ is not supplied to the addition section 13, and thus the band extension section $12_2$ outputs, to the addition section 13, the output signal $j_2$ containing low frequency components, instead of an extended band signal. The addition section 13 adds the sound source separation signal hm, the output signal $j_1$, and the output signal $j_2$ together.

According to the signal processing apparatus 3B according to the present modified example, effects can be produced that are similar to those obtained on the basis of the configuration of the signal processing apparatus 3 described above. Additionally, according to the signal processing apparatus 3B according to the present modified example, whether or not to apply the band extension processing is automatically determined, thus, for example, eliminating the need for the user to learn in advance to which of the sound source separation signals the band extension processing is to be applied and select whether or not to apply the band extension processing during the remastering step.

Modified Example

The plurality of embodiments of the present disclosure has been described. However, the present disclosure is not limited to the embodiments described above, and various modifications can be made to the embodiments without departing from the scope of the present disclosure.

In the embodiments described above, the type of the sound source is used as an attribute of the sound source. However, another attribute such as a signaling property of the sound source may be used.

In a case where DNN or LSTM is applied as the sound source separation section, typically, an input to a network is considered to be an amplitude spectrum of a mixed sound signal, and training data is considered to be an amplitude spectrum of a sound of a target sound source. However, sound source separation signals obtained by sound source separation may be used as the training data in learning.

The present disclosure can also adopt a configuration of cloud computing in which a plurality of apparatuses executes processing of one function in a shared and cooperative manner via a network.

The present disclosure can also be implemented in any form such as an apparatus, a method, a program, or a system. For example, by providing a downloadable program that executes the functions described above in the embodiments and downloading and installing the program in an apparatus not having the functions described above in the embodiments, the control described in the embodiments can be performed in the apparatus. The present disclosure can also be implemented by a server that distributes such a program. Further, the matters described in the embodiments and the modified examples can be combined as appropriate. In addition, the effects illustrated herein do not make the contents of the disclosure interpreted in a limited manner.

The present disclosure can adopt the following configurations.

(1)

A signal processing apparatus including:

a sound source separation section configured to apply sound source separation processing to a mixed sound signal including a mixture of signals of a plurality of sound sources; and band extension sections configured to apply frequency band extension processing to respective sound source separation signals obtained by separation by the sound source separation section.

(2)

The signal processing apparatus according to (1), in which the band extension sections apply frequency band extension processing corresponding to an attribute of the sound source separation signal.

(3)

The signal processing apparatus according to (1) or (2), including:

an addition section configured to add together outputs of the band extension sections provided for the respective sound source separation signals; and a frequency envelope shaping section configured to shape a frequency envelope of a synthesized output signal to be output from the addition section.

(4)

The signal processing apparatus according to (3), in which, assuming that f1 is a lower limit of frequencies extended by the frequency band extension processing, the frequency envelope shaping section shapes the frequency envelope of the synthesized output signal in a case where predetermined discontinuity is detected between a portion of the frequency envelope preceding f1 and a portion of the frequency envelope succeeding f1.

(5)

The signal processing apparatus according to (4), in which presence of the discontinuity is detected in a case where a difference in signal energy between the portion of the frequency envelope preceding f1 and the portion of the frequency envelope succeeding f1 is equal to or greater than a predetermined value.

(6)

The signal processing apparatus according to (1) or (2), including:

a phase rotation section configured to apply processing for rotating phases of output signals from the band extension sections.

(7)

The signal processing apparatus according to (6), in which the phase rotation section includes an all-pass filter.

(8)

The signal processing apparatus according to (1), in which the band extension sections output only an extended band signal that is a signal with a band extended by the frequency band extension processing.

(9)

The signal processing apparatus according to (8), including:

a down converter configured to apply down sampling processing to the mixed sound signal including a signal of a sound source containing high frequency components higher than a predetermined frequency; and an addition section configured to add the mixed sound signal and the extended band signal together, in which the sound source separation section applies the sound source separation processing to the signal to which the down sampling processing has been applied.

(10)

The signal processing apparatus according to (1), including:

an addition section configured to add together the sound source separation signal to which the frequency band extension processing has been applied and the sound source separation signal to which the band extension processing has not been applied.

(11)

The signal processing apparatus according to (10), including:

a determination section configured to determine whether or not to apply the frequency band extension processing to the sound source separation signals.

(12)

The signal processing apparatus according to (11), in which the determination section determines not to apply the frequency band extension processing to the sound source separation signal in a case where the sound source separation signal contains high frequency components equal to or greater than a predetermined frequency, and determines to apply the frequency band extension processing to the sound source separation signal in a case where the sound source separation signal contains no high frequency components equal to or greater than a predetermined frequency.

(13)

A signal processing method including:

by a sound source separation section, applying sound source separation processing to a mixed sound signal including a mixture of signals of a plurality of sound sources; and by band extension sections, applying frequency band extension processing to respective sound source separation signals obtained by separation by the sound source separation section.

(14)

A program causing a computer to execute a signal processing method including:

by a sound source separation section, applying sound source separation processing to a mixed sound signal including a mixture of signals of a plurality of sound sources; and by band extension sections, applying frequency band extension processing to respective sound source separation signals obtained by separation by the sound source separation section.

REFERENCE SIGNS LIST

1, 2, 2A, 3, 3A, 3B: Signal processing apparatus
11: Sound source separation section
11A: Down converter
12: Band extension section
13: Addition section
21: Frequency envelope shaping section
22: Phase rotation section

The invention claimed is:

1. A signal processing apparatus comprising:

a sound source separation section configured to apply sound source separation processing to a mixed sound signal including a mixture of signals of a plurality of sound sources;

a down converter configured to apply down sampling processing to the mixed sound signal including a signal of a sound source containing high frequency components higher than a predetermined frequency; and band extension sections configured to apply frequency band extension processing to respective sound source separation signals obtained by separation by the sound source separation section, each of the band extension sections comprising an up converter configured to perform up sampling wherein the band extension processing is executed after up sampling.

2. The signal processing apparatus according to claim 1, wherein the band extension sections apply frequency band extension processing corresponding to an attribute of the sound source separation signal.

3. The signal processing apparatus according to claim 1, comprising:

an addition section configured to add together outputs of the band extension sections provided for the respective sound source separation signals; and a frequency envelope shaping section configured to shape a frequency envelope of a synthesized output signal to be output from the addition section.

4. The signal processing apparatus according to claim 3, wherein, assuming that f1 is a lower limit of frequencies extended by the frequency band extension processing, the frequency envelope shaping section shapes the frequency envelope of the synthesized output signal in a case where predetermined discontinuity is detected between a portion of the frequency envelope preceding f1 and a portion of the frequency envelope succeeding f1.

5. The signal processing apparatus according to claim 4, wherein presence of the discontinuity is detected in a case where a difference in signal energy between the portion of the frequency envelope preceding f1 and the portion of the frequency envelope succeeding f1 is equal to or greater than a predetermined value.

6. The signal processing apparatus according to claim 1, comprising:

a phase rotation section configured to apply processing for rotating phases of output signals from the band extension sections.

7. The signal processing apparatus according to claim 6, wherein the phase rotation section includes an all-pass filter.

8. The signal processing apparatus according to claim 1, wherein the band extension sections output only an extended band signal that is a signal with a band extended by the frequency band extension processing.

9. The signal processing apparatus according to claim 8, comprising:

an addition section configured to add the mixed sound signal and the extended band signal together, wherein the sound source separation section applies the sound source separation processing to the signal to which the down sampling processing has been applied.

10. The signal processing apparatus according to claim 1, comprising:

an addition section configured to add together the sound source separation signal to which the frequency band extension processing has been applied and the sound source separation signal to which the frequency band extension processing has not been applied.

11. The signal processing apparatus according to claim 10, comprising:

a determination section configured to determine whether or not to apply the frequency band extension processing to the sound source separation signals.

12. The signal processing apparatus according to claim 11, wherein the determination section determines not to apply the frequency band extension processing to the sound source separation signal in a case where the sound source separation signal contains high frequency components equal to or greater than a predetermined frequency, and determines to apply the frequency band extension processing to the sound source separation signal in a case where the sound source separation signal contains no high frequency components equal to or greater than a predetermined frequency.

13. A signal processing method comprising:

by a sound source separation section, applying sound source separation processing to a mixed sound signal including a mixture of signals of a plurality of sound sources;

by a down converter, applying down sampling processing to the mixed sound signal including a signal of a sound source containing high frequency components higher than a predetermined frequency;

by band extension sections, applying frequency band extension processing to respective sound source separation signals obtained by separation by the sound source separation section; and by an up converter, performing up sampling wherein the band extension processing is applied after up sampling.

14. A program causing a computer to execute a signal processing method comprising:

by a sound source separation section, applying sound source separation processing to a mixed sound signal including a mixture of signals of a plurality of sound sources;

by a down converter, applying down sampling processing to the mixed sound signal including a signal of a sound source containing high frequency components higher than a predetermined frequency;

by band extension sections, applying frequency band extension processing to respective sound source separation signals obtained by separation by the sound source separation section; and by an up converter, performing up sampling wherein the band extension processing is applied after up sampling.

* * * * *